United States Patent [19]
Jones

[11] 4,201,019
[45] May 6, 1980

[54] GREENHOUSES

[75] Inventor: Colin Jones, Sheffield, England

[73] Assignee: Linkman Building Company Limited, Tinsley, England

[21] Appl. No.: 924,907

[22] Filed: Jul. 14, 1978

[30] Foreign Application Priority Data

Dec. 1, 1977 [GB] United Kingdom ............... 50170/77

[51] Int. Cl.² .............................................. A01G 9/14
[52] U.S. Cl. .......................................... 52/15; 52/92; 52/204; 52/57

[58] Field of Search ................... 52/641, 710, 648, 90, 52/92, 93, 11–15

[56] References Cited

U.S. PATENT DOCUMENTS

3,340,657  9/1967  Thomas ..................................... 52/93

*Primary Examiner*—John E. Murtagh

[57] ABSTRACT

A greenhouse having a ridge member of hollow section with a T-slot in its underside from which T-bolts depend for the connection of corner jointing brackets to which endmost glazing bars are bolted.

4 Claims, 6 Drawing Figures

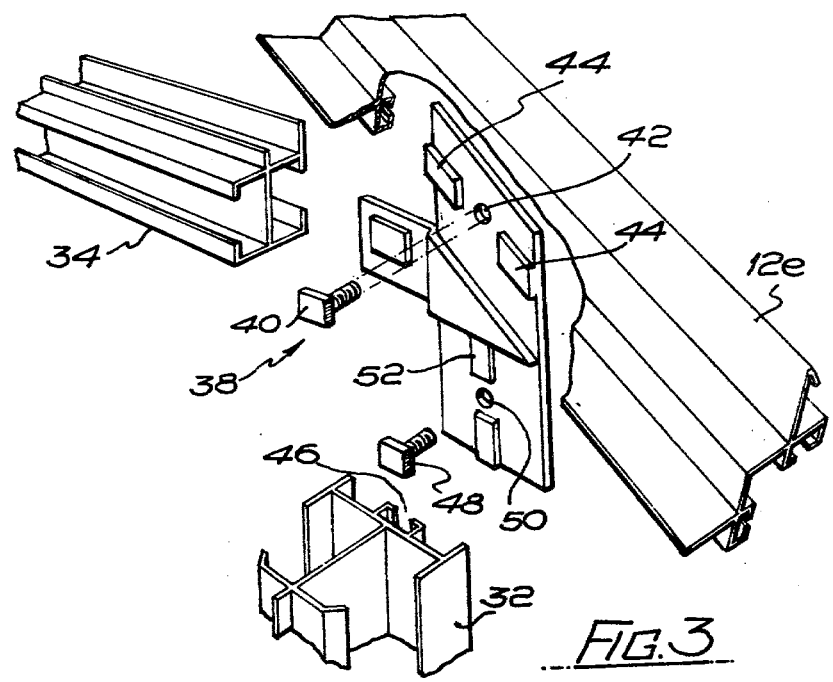
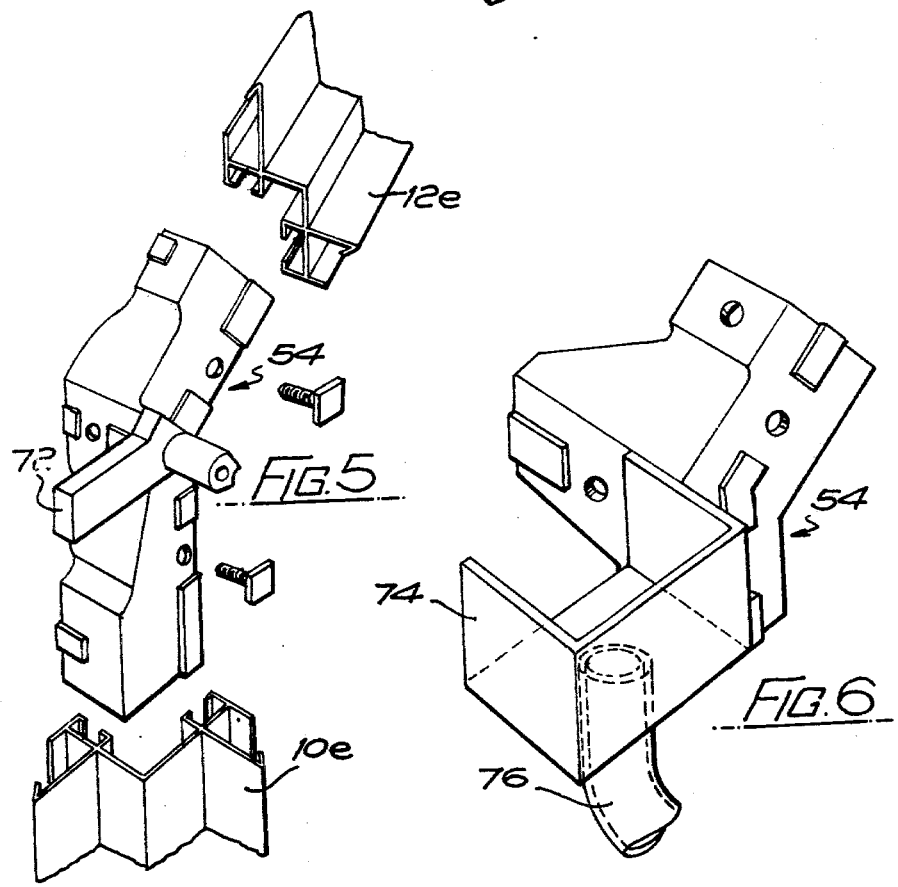

GREENHOUSES

The invention relates to greenhouses and the main object of the invention is to provide a greenhouse which can very quickly and easily be erected.

A further object of the invention is to provide a greenhouse of very strong construction.

According to the invention, a greenhouse includes a ridge member of hollow section which incorporates a T-slot in its underside, respective corner jointing brackets being secured to the opposite ends of said ridge member by T-bolts depending from said T-slot. The respective corner jointing brackets will preferably be provided with pairs of shallow projections flanking respective holes though which the T-bolts extend, said projections engaging the mouth of the T-slot to stiffen the resulting joints. Other joints will preferably be similarly constructed, that is to say, joints between the endmost sloping glazing bars and upright sections in the end walls of the greenhouse, and joints between the endmost sloping glazing bars, endmost vertical glazing bars and respective gutter sections.

In order that the invention may be fully understood and readily carried into effect, the same will now be described, by way of example only, with reference to the accompanying drawings, of which:

FIGS. 2, 3 and 4 are respective exploded views of various joints indicated in FIG. 1, and FIGS. 5 and 6 will be referred to when describing possible modifications.

Figure 1:
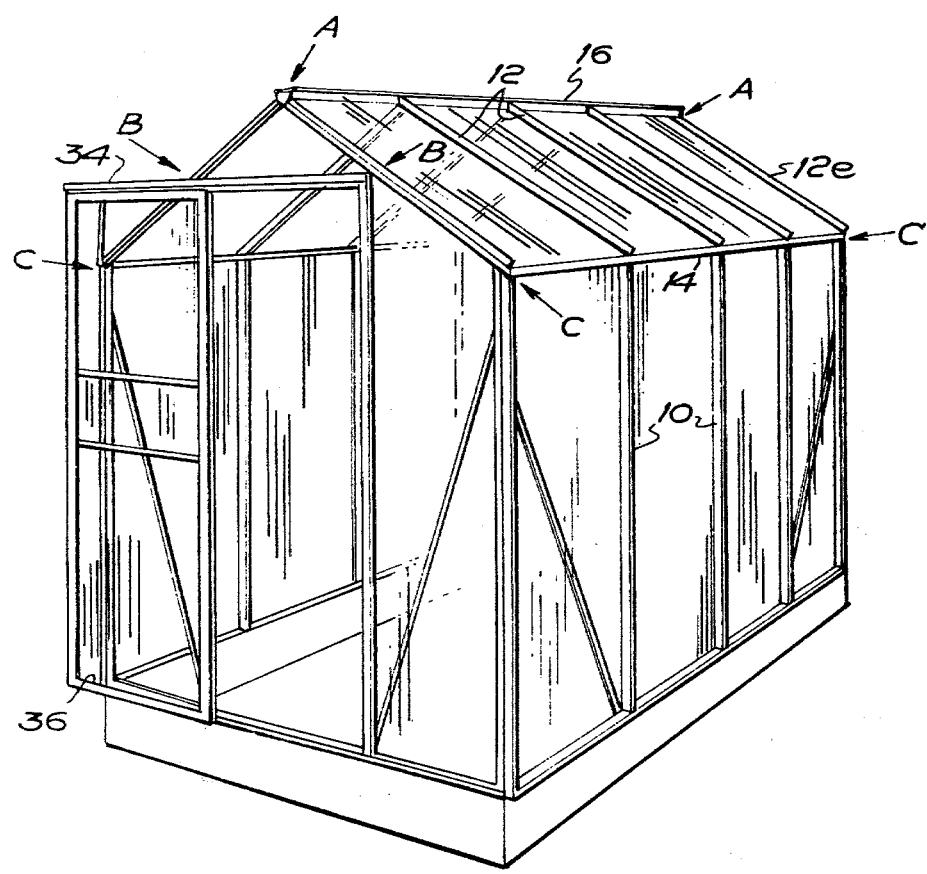
FIG. 1 is a perspective view of a greenhouse.

Referring now to FIG. 1, the greenhouse there illustrated has a frame made of extruded aluminium glazing bars, that is to say vertical glazing bars 10 spaced apart along opposite side walls, sloping glazing bars 12 spaced apart along the roof and meeting respective gutter sections 14 on opposite sides of the roof, and a special ridge section 16.

Figure 2:
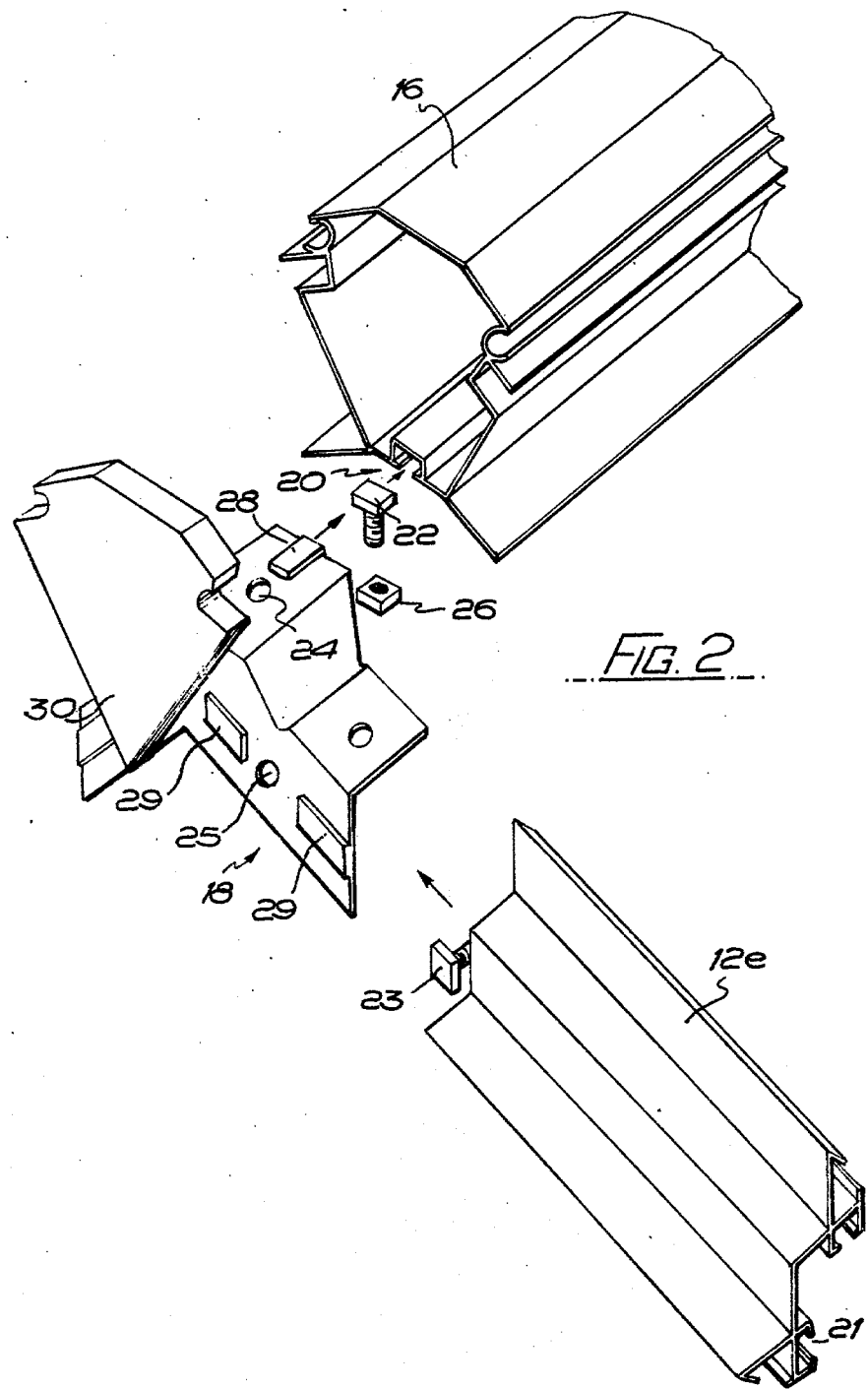

Referring now in particular to FIG. 2, there is there illustrated a joint (indicated A in FIG. 1) which is made between the special ridge section 16 and endmost sloping glazing bars 12e, the joint involving the use of a bracket generally indicated 18 to which the glazing bars and the ridge section are bolted. The ridge section incorporates a T-slot 20 in which the head of the T-bolt 22 is inserted. When the joint has been assembled the T-bolt extends through a hole 24 in the bracket and a nut 26 engages the thread of the bolt. Shallow projections 28 which are formed integrally with the bracket and which are located on opposite sides of the hole 24 (one only being visible in FIG. 2) are provided to engage the mouth of the T-slot in the ridge section and to stiffen the assembled joint. (An end plate 30 is used to blank off the open end of the ridge section 16). Similarly, the glazing bars each incorporate a T-slot 21 in which the head of a T-bolt 23 is inserted, the bolt 23 extending through a hole 25 in the bracket when the joint has been assembled. Shallow projections 29 are provided on opposite sides of the hole 25, as shown, and engage the mouth of the T-slot 21 to stiffen the assembled joint.

In FIG. 3 there is illustrated in exploded view a joint (indicated B in FIG. 1) between the endmost sloping glazing bar 12e and an upright 32 (the latter constituting at one end of the greenhouse one side edge of a door opening as shown in FIG. 1, the door being slidable laterally on upper and lower horizontal rails 34 and 36). The joint at this point involves the use of a bracket generally indicated 38 to which the glazing bar and the upright 32 are bolted. The T-slot of the glazing bar receives the head of a T-bolt 40 which extends through a hole 42 in the bracket 38. Shallow projections 44 which are formed integrally with the bracket and which are located as shown on opposite sides of the hole 42 are provided for engaging the mouth of the T-slot in the glazing bar 12e and to stiffen the assembled joint. Similarly, a T-slot 46 which is incorporated in the upright 32 receives a T-bolt 48 which extends through a hole 50 in the bracket, and shallow projection 52 which are formed integrally with the bracket and which are located as shown on opposite sides of the hole 50 are provided for engaging the mouth of the T-slot 46 and for stiffening the assembled joint.

Figure 4:
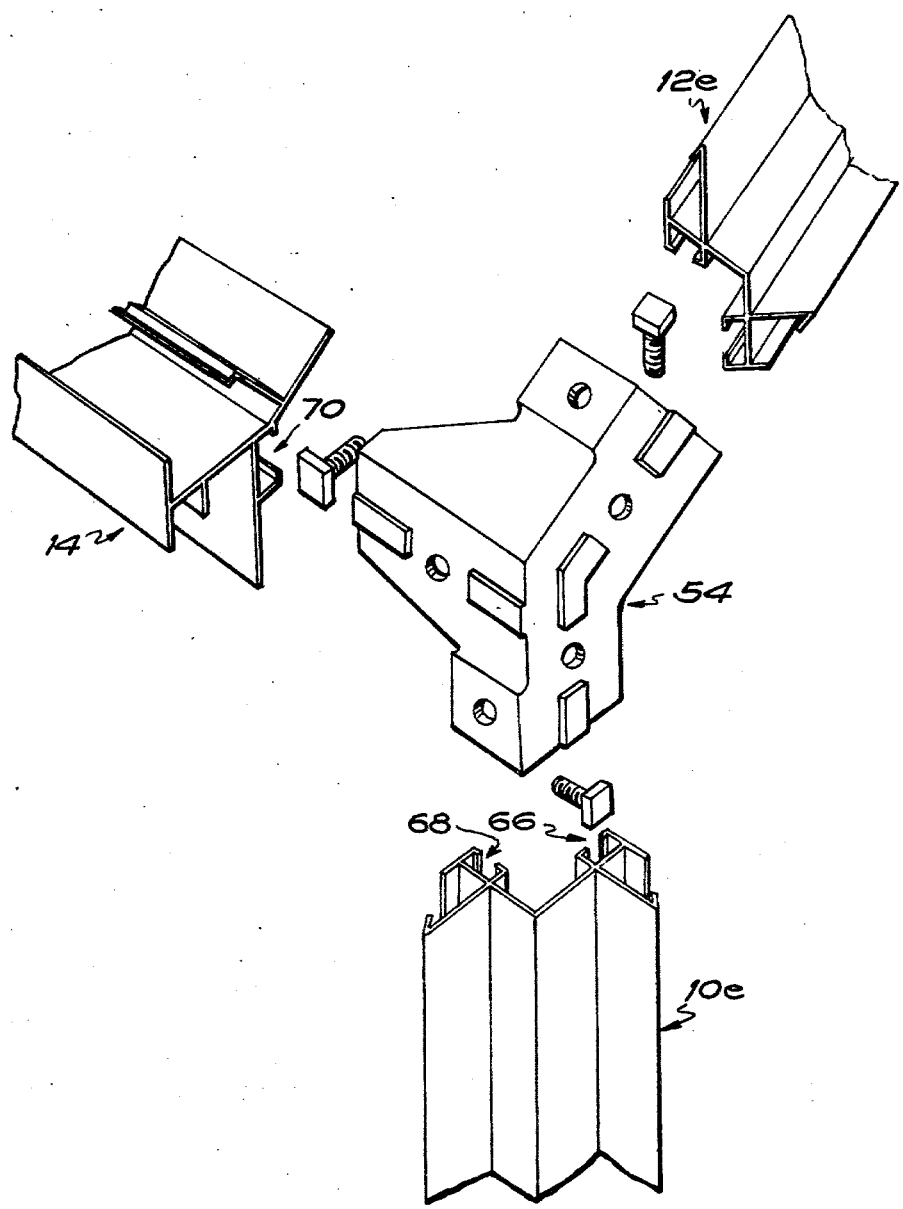

Referring now to FIG. 4, the joint there illustrated in exploded view (and which is indicated C in FIG. 1) is made between endmost sloping glazing bars 12e, endmost vertical glazing bars 10e and respective gutter sections 14. This particular joint involves the use of a bracket 54 and the latter is provided with holes 56, 58, 60, 62 and 64 for receiving respective T-bolts (only three of which are shown in the drawing) the heads of which are received in the T-slots of the respective sections. The vertical glazing bars 10e each have a pair of T-slots 66 and 68 at right angles, as shown. The gutter sections each have a single T-slot 70 facing inwards. As in the case of each joint previously described, the bracket 54 is provided with pairs of shallow projections for engaging the mouth of one T-slot of each section bolted to it, the resulting joint being very strong and stiff.

Thus there is provided a greenhouse which can be supplied in "knocked-down" form but which is very simple to construct by the purchaser and which is very rigid when constructed.

Various modifications may be made without departing from the scope of the invention. For example, in FIG. 5 there is illustrated a modification of the bracket 54, that is to say the addition of a cover piece 72 for blanking off one end of the gutter section 14. In FIG. 6, there is illustrated a further development of this, that is to say the forming of an integral element 74 on the bracket 54, the element 74 constituting an extension piece for the gutter section 14 into which a rainwater drain pipe 76 is connected as shown. It will be understood that the greenhouse may be of any height, width, and length.

What I claim and desire to secure by Letters Patent is:

1. In a greenhouse, a ridge member of hollow section; a T-slot in the underside of the ridge member; respective corner jointing brackets disposed at opposite ends of the ridge member and secured thereto by T-bolts depending from the T-slot; and pairs of endmost sloping glazing bars secured to said jointing brackets, said respective corner jointing brackets being provided with pairs of shallow projections flanking respective holes through which the T-bolts extend, said projections engaging the mouth of the T-slot to stiffen the resulting joints.

2. In a greenhouse according to claim 1, and including upright sections in end walls of the greenhouse and respective gutter sections connecting lower ends of the pairs of sloping glazing bars, the joints between the upright sections and the endmost sloping glazing bars and the joints between the respective gutter sections and the lower ends of said sloping glazing bars being effected by T-bolts engaging respective jointing brackets each of which is provided with a pair of shallow projections flanking each hole through which a T-bolt is to extend, each pair of projections being engaged in the mouth of a T-slot in the section concerned.

3. In a greenhouse according to claim 3, at least one of the brackets connecting the endmost sloping glazing bars to a respective gutter section being provided with a cover piece for blanking off one end of said gutter section.

4. In a greenhouse according to claim 3, at least one of the brackets connecting the endmost sloping glazing bars to a respective gutter section being provided with an integral element constituting a blanked off extension piece for one end of said gutter section, the extension piece being provided for the connection of a rainwater drain pipe.

* * * * *